United States Patent [19]

Reisman

[11] Patent Number: 5,177,395
[45] Date of Patent: Jan. 5, 1993

[54] CADMIUM FREE BUG LAMP WITH RUTILE TIO$_2$ COATING CONTAINING CHROMIUM AND ANTIMONY IN THE RUTILE LATTICE

[75] Inventor: Juliana P. Reisman, Lyndhurst, Ohio

[73] Assignee: General Electric Company, Schenectady, N.Y.

[21] Appl. No.: 669,711

[22] Filed: Mar. 15, 1991

[51] Int. Cl.⁵ .......................... H01K 1/32; C09C 1/36
[52] U.S. Cl. .................................... 313/112; 313/116;
313/315; 313/635; 106/441; 106/436
[58] Field of Search ............... 313/112, 113, 116, 635,
313/315; 106/438, 441, 436; 524/497, 785, 457

[56] References Cited

U.S. PATENT DOCUMENTS

| | | | |
|---|---|---|---|
| 3,125,457 | 3/1964 | Meister . | |
| 3,320,460 | 5/1967 | Boushard et al. . | |
| 3,640,744 | 2/1972 | Dietz et al. | 106/438 |
| 4,209,430 | 6/1980 | Weber | 524/497 |
| 4,421,803 | 12/1983 | Czeiler et al. | 313/112 |
| 4,633,127 | 12/1986 | Beurskens et al. | 313/112 |
| 4,918,138 | 4/1990 | Hara et al. | 524/785 |
| 4,999,055 | 3/1991 | Holtzen et al. | 106/436 |
| 5,032,425 | 7/1991 | Livsey et al. | 524/457 |

Primary Examiner—Donald J. Yusko
Assistant Examiner—John Giust
Attorney, Agent, or Firm—Edward M. Corcoran; Stanley C. Corwin

[57] ABSTRACT

A cadmium free bug lamp which emits a yellow color when energized and which has very low emission in the range of from 310-380 nm employs a coating wherein the yellow emitting pigment is a rutile TiO$_2$ containing minor amounts of antimony and chromium in the rutile crystal lattice.

14 Claims, 2 Drawing Sheets

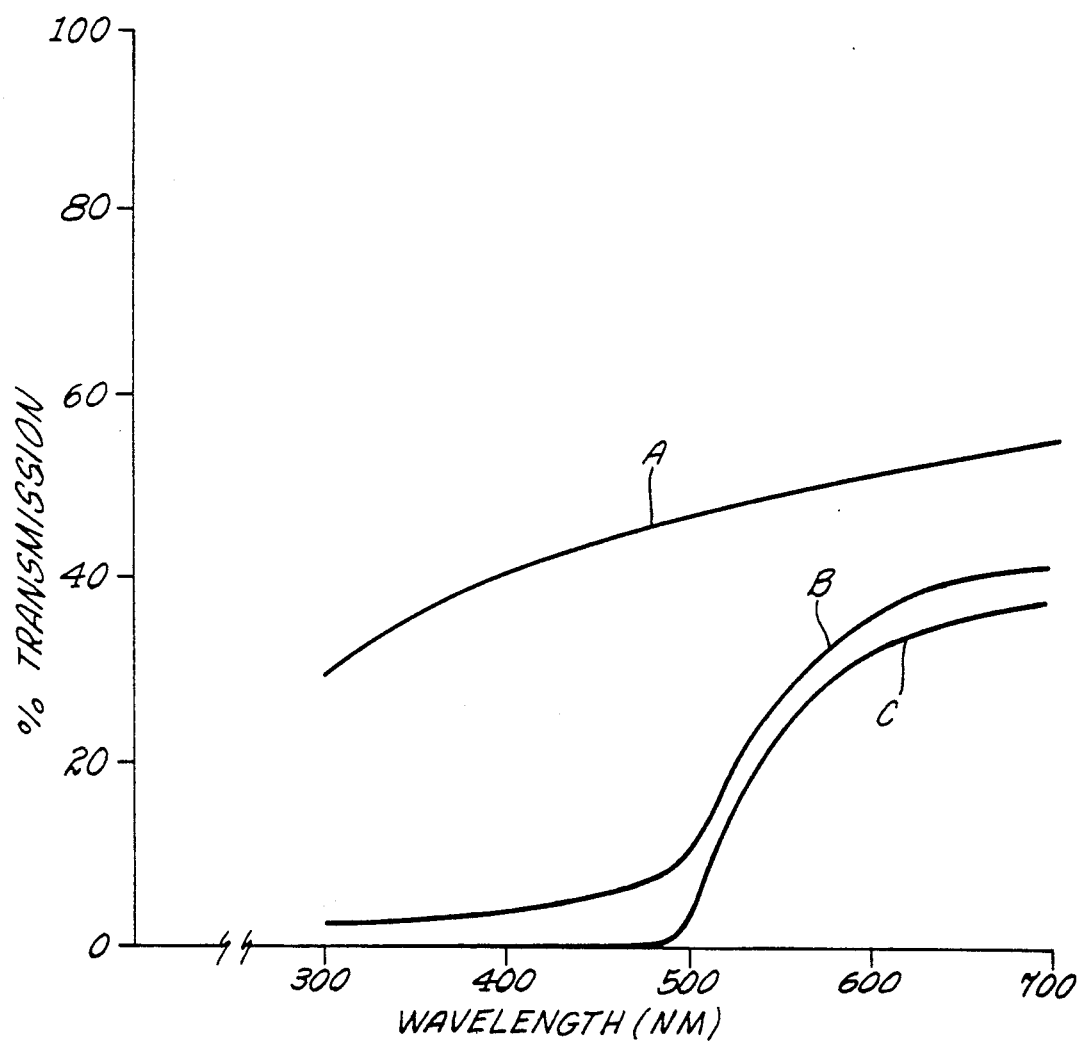

CADMIUM FREE BUG LAMP WITH RUTILE TIO₂ COATING CONTAINING CHROMIUM AND ANTIMONY IN THE RUTILE LATTICE

BACKGROUND OF THE INVENTION

1. Field of the Invention

The present invention relates to a cadmium free bug lamp. More particularly, the present invention relates to a yellow bug lamp comprising an electric light source enclosed within a vitreous, light transmissive envelope with a cadmium free coating deposited on the surface of the envelope.

2. Background of the Disclosure

Bug lamps comprising conventional incandescent lamps which emit a yellow color when energized are well known and old to those skilled in the art and to the consumer. Such lamps find use in both indoor and outdoor environments where the presence of both flying and crawling insects is a problem. Conventional incandescent lamps attract insects due to a significant amount of transmission in the near ultraviolet (UV) portion of the electromagnetic spectrum having a wavelength generally ranging between about 300 nm–400 nm. That region of the electromagnetic spectrum which is most attractive to a wide variety of nocturnal insects such as moths, leaf hoppers, May flies, caddis flies, various beetles, midges, mosquitoes and the like is in the near UV (310–380 nm) region of the spectrum. Incandescent lamps which emit a yellow colored light have been found to have minimal attraction for various insects while at the same time provide a reasonable amount of visible light illumination for various uses such as over entrance ways, patios, porches and the like. Such lamps generally comprise a glass envelope enclosing a filament within and terminating at one end in a conventional metal screw base, with the interior or exterior surface of the glass envelope containing an inorganic pigment coating which includes cadmium sulfide as the main pigment for emitting a yellow colored light. Some lamp manufacturers apply such coatings electrostatically as a dry powder to the interior surface of the glass lamp envelope whose wall is given a positive potential with respect to the powder. Electrostatic forces cause the powder to adhere to the interior surface or wall of the glass envelope. An incandescent lamp of this kind is disclosed in, for example, U.S. Pat. No. 3,320,460. At least one lamp manufacturer applies an enamel coating containing such pigments to the exterior surface of the glass envelope. In either case, the coatings must be resistant to the heat generated by operation of the lamp.

Recently, cadmium and cadmium containing compounds such as cadmium sulfide yellow pigments have been declared to be hazardous materials with respect both to workers who are exposed to such materials and also to the environment with respect to disposal of waste containing cadmium and cadmium containing compounds. As a result, there is now a world-wide drive on to decrease the use of such cadmium containing compounds and most countries have enacted laws to restrict such use. Accordingly, there is a compelling interest in eliminating or at least reducing or minimizing the amount of cadmium in lamps, including the yellow colored bug lamps which employ cadmium sulfide as all or a portion of the yellow pigment. One attempt to minimize the amount of cadmium present in a coating used for bug lamps is disclosed in U.S. Pat. No. 4,633,127 wherein the amount of cadmium in the coating is reduced by up to about 50–60%. However, a significant amount of the coating is still a cadmium containing pigment. Accordingly, there is a need to still further reduce and preferably even eliminate altogether cadmium compounds from coatings employed in yellow bug lamps.

SUMMARY OF THE INVENTION

The present invention relates to a lamp which emits a yellow color when energized and which comprises an electric light source enclosed within a vitreous envelope, with a coating disposed on said envelope which contains less than 15 wt. % of a cadmium containing compound. In one embodiment, the present invention relates to a typical incandescent yellow bug lamp which has a coating on the surface of the vitreous lamp envelope, wherein the coating emits a yellow light when the lamp is energized and wherein the amount of cadmium containing compound or pigment present in said coating is less than 15 wt. %. It has been found that a satisfactory bug lamp which exhibits a yellow color when energized is obtained when the pigment comprises a rutile titanium dioxide ($TiO_2$) containing minor amounts of antimony and chromium which slightly modify the rutile lattice constants.

Thus, the present invention relates to a lamp which emits a yellow color when energized and which comprises a light transmissive envelope enclosing an electric light source within, wherein the surface of said envelope contains a coating which includes, as a pigment, a rutile $TiO_2$ containing minor amounts of chromium and antimony in the rutile crystal lattice and which emits a yellow color when the light source within the lamp is energized. In one preferred embodiment, such coatings will not contain any cadmium compounds. Incandescent lamps containing only this pigment in the coating as the source of yellow light emission have less than about 4% light transmission in the critical region of 310–380 nm. In contrast, a standard white incandescent lamp has about 40% transmission in this region. Further, lamps employing only this compound as the yellow light emitting pigment have a pleasing peach color in an unlit condition, but a yellow color when lit. Accordingly, if desired, one may add a minor amount (i.e., <15 wt. %) of a cadmium containing pigment such as cadmium sulfide or any other yellow pigment to the coating to obtain a yellow color in the unlit condition, but it is preferred that no cadmium compounds be used in the coating.

BRIEF DESCRIPTION OF THE DRAWINGS

FIG. 2 is a graph illustrating the spectral light output of a typical household incandescent lamp emitting a white light, a yellow bug lamp of the prior art and a yellow bug lamp according to the present invention.

DETAILED DESCRIPTION

Figure 1:
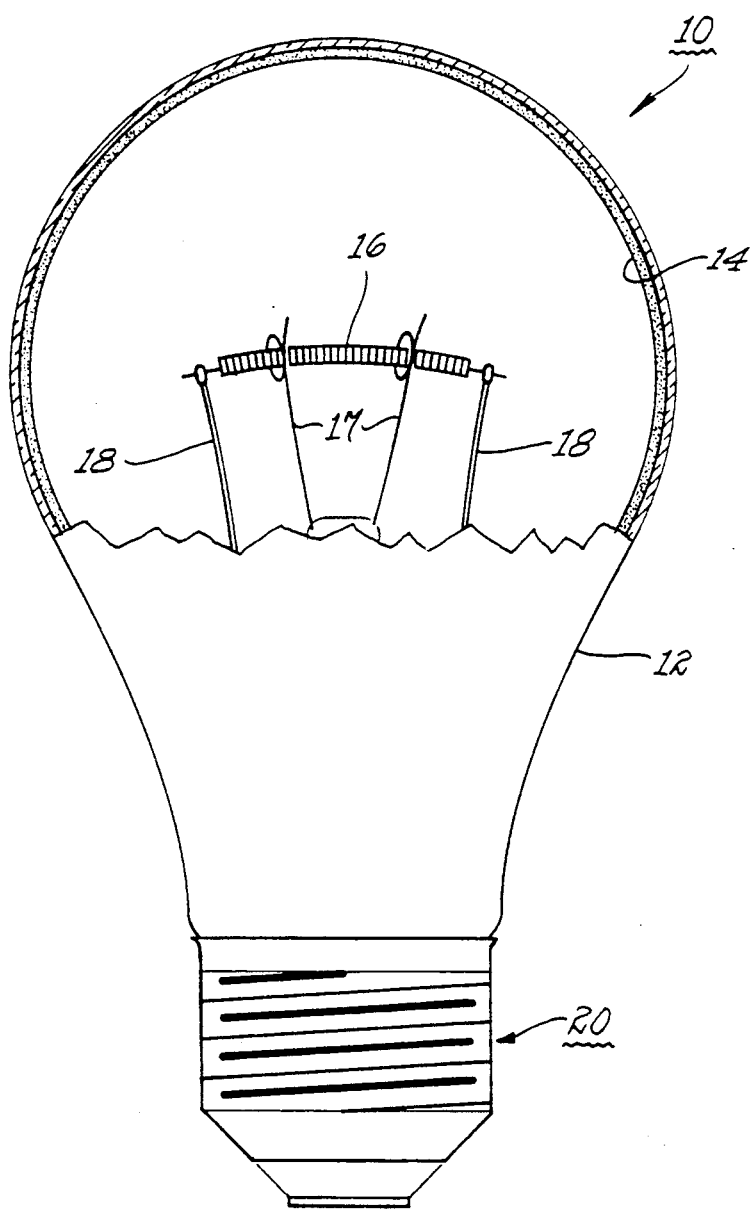
FIG. 1 schematically illustrates a typical incandescent lamp wherein the inside surface of the glass envelope contains a coating according to the present invention.

Turning to FIG. 1, a conventional A-line type of incandescent lamp 10 well known and old to those skilled in the art and to the average consumer is depicted as having vitreous, light transmissive glass envelope 12 enclosing within a filament 16 electrically connected to and supported on each end by molybdenum leads 18 which extend through the seal of the lamp (not shown) and attached by means not shown to standard metal screw base 20. Additional support for the filament 16, if necessary, is provided by additional support wires 17. The interior surface of envelope 12 is coated with a powder coating 14. Powder coating 14 is applied electrostatically by means well known to those skilled in the art such as is disclosed, for example, in U.S. Pat. Nos. 2,995,463; 3,125,457; 3,320,460 and 4,633,127. In a conventional white type of incandescent lamp, coating 14 comprises a particulate mixture of alumina and silica or clay particles. The alumina produces the white appearing light (along with a concomitant reduction in light output) and the silica or clay aids as a light scattering component of the coating. In a lamp of the present invention coating 14 will contain as the yellow light emitting pigment a pigment consisting essentially of rutile $TiO_2$ which contains minor amounts of antimony and chromium in the rutile lattice structure. This pigment produces a yellow color when the lamp is in an energized condition and is a pleasant peach color when the lamp is unlit. The antimony and chromium are present as part of the titania rutile lattice and not as separate phases of antimony oxide or chromium oxide. In general, the amount of antimony present will be less than about 10 wt. % of the pigment and the amount of chromium present will be less than about 5 wt. %. A commercially available pigment meeting these requirements and suitable for use in the present invention is V-9140 Bright Golden-Yellow, available from the Ferro Corporation, Color Division, in Cleveland, Ohio, having an average particle size of about 0.8 microns. This pigment is basically a rutile titanium dioxide containing 48 wt. % titanium, 8.6 wt. % Sb and 3.5 wt. % Cr, with the balance being oxygen. This pigment can be used as the sole pigment for producing the yellow color or it can be mixed with other pigments, if desired. An example of a cadmium free composition of a powder coating useful for coating the interior lamp envelope surface to produce a yellow bug lamp according to the present invention is set forth below, with the various components expressed in percent by weight of the total powder coating composition:

| THE INVENTION | |
|---|---|
| Pigment | wt. % |
| Ferro V-9140 Golden-Yellow (TiSbCr)O$_2$ | 32 |
| Kaolin Clay (Burgess #50) | 45 |
| Fumed Hydrophobic Silica (DeGussa R-972) | 18 |
| Fumed Hydrophobic Silica (DeGussa OX-50) | 5 |
| | 100 |

The kaolin clay and silicas are the light scattering materials. The clay is an aluminosilicate and has an average particle size of 0.46 microns. The R-972 and OX-50 silicas are both fumed silicas and have an average particle size of 16 and 40 nm, respectively.

A typical prior art powder coating is set forth below:

| PRIOR ART | |
|---|---|
| Pigment | wt. % |
| Cadmium sulfide (Ciba-Geigy) | 45 |
| Kaolin clay (Burgess #50) | 45 |
| Fumed hydrophobic SiO$_2$ (R-972) | 10 |
| | 100 |

FIG. 2 is a graph illustrating the percent transmittance as a function of wavelength of standard 60 watt A-line incandescent lamps having (i) the cadmium containing prior art yellow emitting coating set forth above (C), (ii) a cadmium-free coating of the invention also set forth above (B) and (iii) that of a typical white lamp having an alumina and alumina silica powder mixture coating (A). Outdoor tests made by hanging fly paper near the lamps disclosed no real difference over the same period of time in the amount of bugs on the fly paper for a cadmium free bug lamp of the invention and a cadmium containing prior art yellow bug lamp. Both types of lamps had the coatings whose compositions are set forth above. One can see the substantial reduction in UV (300-400 nm) transmission of a lamp using a cadmium free coating of the invention compared to a prior art bug lamp using cadmium sulfide as the yellow emitting pigment.

Additional tests were made of light transmission as a function of wavelength for a lamp of the present invention having no cadmium in the coating; a commercially available competitive yellow bug lamp having slightly greater than 45 wt. % cadmium sulfide in the coating and a different commercially available competitive yellow bug lamp which contained 38% cadmium sulfide in the coating. The results showed the yellow bug lamp of the present invention to be no less effective in cutting off the blue and UV portion of the spectrum than the competitive lamp having 45 wt. % cadmium sulfide in the coating and substantially superior to the other competitive lamp which contained 38 wt. % cadmium sulfide in the coating.

While the foregoing illustrations have been made with respect to employing standard A-line incandescent lamps for the examples, the invention is not intended to be restricted to such lamps. Thus, it will be understood that the source of light could be an arc instead of a filament. The lamp itself could be a floodlight or spotlight instead of a standard A-line type of lamp, etc. Further, it is understood that a coating containing the pigment employed in this invention can be employed as a powder coating electrostatically applied as set forth above or as an enamel comprising a dispersion of the pigment in a suitable fluid or semi-fluid medium.

What is claimed is:

1. An electric lamp which emits a yellow color when energized and which comprises a light transmissive envelope enclosing an electric light source within wherein the surface of said envelope contains a coating which comprises a rutile type $TiO_2$ pigment which contains minor amounts of chromium and antimony in the the rutile lattice.

2. The lamp of claim 1 wherein said coating contains no more than about 15 wt. % of a cadmium containing pigment based on the total coating weight.

3. The lamp of claim 2 wherein said coating is essentially cadmium free.

4. The lamp of claim 3 having less than 4% transmission in the range of 310-380 nm.

5. The lamp of claim 4 wherein said antimony and chromium are present in said pigment in an amount not exceeding about 10 wt. % and 5 wt. %, respectively.

6. The lamp of claim 5 having a peach color in an unlit condition.

7. An electric lamp which emits a yellow color when energized and which comprises a vitreous, light transmissive envelope enclosing a filament within and wherein the surface of said envelope contains a coating which comprises a rutile $TiO_2$ type of pigment which contains minor amounts of antimony and chromium in the rutile lattice and not as separate phases.

8. The lamp of claim 7 wherein said antimony and chromium are present in said rutile crystal lattice.

9. The lamp of claim 8 wherein said antimony and chromium are present in said pigment is an amount not greater than about 10 wt. % and 5 wt. %, respectively.

10. The lamp of claim 9 wherein no cadmium is present in said coating.

11. The lamp of claim 9 wherein cadmium is present in said coating in an amount less than about 15 wt. %.

12. An electric lamp which emits a yellow color when energized and which comprises a vitreous, light transmissive envelope enclosing an electric light source within wherein the surface of said envelope contains a coating having a pigment which consists essentially of a rutile type $TiO_2$ containing minor amounts of chromium and antimony in the rutile lattice and not as separate phases as the yellow light-emitting pigment.

13. The lamp of claim 12 wherein said coating is essentially cadmium free.

14. The lamp of claim 13 wherein said antimony and chromium are present in said rutile $TiO_2$ lattice in an amount not exceeding 10 wt. % and 5 wt. %, respectively.

* * * * *